United States Patent [19]
Kilmer, Jr. et al.
[11] 3,919,447
[45] Nov. 11, 1975

[54] SPECTRAL DIFFERENTIAL CODED CARD

[75] Inventors: Charlie C. Kilmer, Jr.; George J. Laurer, both of Raleigh, N.C.

[73] Assignee: International Business Machines Corporation, Armonk, N.Y.

[22] Filed: Mar. 20, 1974

[21] Appl. No.: 453,138

Related U.S. Application Data

[63] Continuation of Ser. No. 213,201, Dec. 28, 1971, abandoned.

[52] U.S. Cl. ............ 428/138; 40/2.2; 235/61.11 E; 235/61.12 N; 250/271; 250/569; 283/6; 283/7; 283/8 R; 340/149 A; 350/316; 428/195; 428/201; 428/203; 428/212; 428/916

[51] Int. Cl.$^2$ .................... G06K 19/02; G06K 7/12

[58] Field of Search ............ 117/1, 1.5; 161/1, 4, 5, 161/6, 36, 113, 166, 254, 256, 146; 40/2.2; 235/61.12 N, 61.11 E; 283/6, 7, 8 R; 340/149 A; 350/316; 250/568, 569, 271

[56] References Cited

UNITED STATES PATENTS

| | | | |
|---|---|---|---|
| 3,239,815 | 3/1966 | Martens | 340/149 |
| 3,536,894 | 10/1970 | Travioli | 235/61.6 |
| 3,725,184 | 4/1973 | Scopp | 161/6 |
| 3,802,101 | 4/1974 | Scantlin | 40/2.2 |
| 3,829,662 | 8/1974 | Furahashi | 340/149 A |
| 3,830,686 | 8/1974 | Lehrer | 161/6 |

OTHER PUBLICATIONS

Cleverly & Herrman, "Infra-Red Spectra of Textiles," J. Appl. Chem., 11, Sept., 1961, pp. 348 & 350.

Zbinden, "Infrared Spectroscopy of High Polymers," Academic Press, 1964, pp. 13 & 90.

*Primary Examiner*—George F. Lesmes
*Assistant Examiner*—Charles E. Lipsey
*Attorney, Agent, or Firm*—R. Bruce Brodie

[57] ABSTRACT

A card suitable for use in personal and item identification; the card comprises a first film such as polyvinyl chloride with a transmission bandpass in the infra red region, and either a selectively apertured second film laminated on the first film, or, discrete areas of the second film laminated on preselected areas of the first film. The second film is opaque at a single frequency within the first film bandpass. The films may be formed from the same material but for the trace amounts of a carbonyl group in the structure of the second film polymer, the laminate otherwise being transparent and reflectively uniform in the visible light region.

7 Claims, No Drawings

SPECTRAL DIFFERENTIAL CODED CARD

This is a continuation, of application Serial No. 213,201 filed DEc. 28, 1971, now abandoned.

BACKGROUND OF THE INVENTION

This invention relates to cards suitable for personal and item identification, and more particularly toward an improvement in reducing unauthorized detection and counterfeiting of such cards.

In the prior art, as for example set forth in U.S. Pat. No. 3,468,046, issued to Shoji Makishima on Sept. 23, 1969, credit and identity cards formed from flexible-tough thermoplastics are described. Such cards usually have alphanumeric coded indicia raised portions of the card with a signature strip consisting of a titanium dioxide surface occupying other portions of the card. As Makishima correctly points out, the most serioues drawback is that such a credit or identity card can become lost or stolen so as to fall in the hands of unscrupulous persons. Relatedly, cards can also be used as keys to gain access to or activate remote communications terminals, badge readers, and the like. In the latter circumstances, protection against unauthorized reproduction is of special concern.

Many techniques have been suggested to confuse the information on the card and several to hide or mask the data. Among the approaches that have been considered are those of holograms, magnetic recording, infra red inks and phosphorescent inks. Some suffer from cost (holograms), while others suffer from ease of detection (magnetic strips). Typical prior art optional systems use coded indicia on the card, which indicia are interrogated by illuminating the card with light and evaluating the reflective return. Makishima illustratively contemplates a fluorescent screen, non-fluorescent coded indicia carried on the screen, and an ultraviolet filter covering the coded screen to render the code invisible to the eye in ordinary light. When the screen is exposed to ultraviolet light, the screen fluoresces in the visible light region. The coded information is then set forth by contrast.

The protection of a card against counterfeiting presents several aspects. Thus, it is desirable to make it difficult for an unauthorized person to "reverse engineer" such a card. As an example, where coded cards emit visible light when stimulated by light in the ultraviolet region, such cards can be easily compromised due to the availability of U.V. light sources in theatres, bars, and hotels. It is then apparent from the counterfeit viewpoint that the code is formed from a contrast of fluorescent and non-fluorescent areas.

SUMMARY OF THE INVENTION

It is an object of this invention to devise a credit card and the like having coded indicia thereon, the structure of the card inhibiting unauthorized detection and counterfeiting thereof. Relatedly, such coded indicia should be optically readable with the card being formed from one or more materials capable of being tooled, and its optical characteristics should not be altered by the fabrication process.

The foregoing object is satisfied in an embodiment of a laminated structure of polyvinyl chloride (PVC) film fused to polyvinyl chloride acetate (PVCAC) film. This provides a large spectra transmissivity difference in the near infra red region. That is, PVC has a bandpass transmission characteristic in the 3.5 micron to 7 micron wavelength region. PVCAC has the same transmission characteristic but for a near single frequency absorption characteristic in the 5.8 micron region. The card is encoded by either selectively aperturing the PVCAC film or laminating discrete portions of PVAC on selected areas of the PVC film. Significantly, the laminate has a substantially uniform transmissivity and surface reflectance when illuminated by light in the visible region. Also, fusing or bonding does not alter the laminate's optical characteristics. Of importance is the fact that PVC and PVCAC are completely miscible and each laminate layer possesses the same mechanical characteristics as the other. This suggests to the prospective counterfeiter a homogenous and not a laminate material. Note, that commercially available film exhibits the acetate absorption characteristic. Consequently, the unauthorized person would require for example, a micro-tome to distinguish the laminate from homogenous material.

DESCRIPTION OF THE PREFERRED EMBODIMENT

It is well-known that the visible spectrum, as seen by the average human eye, extends from violet (wavelength of 0.38 microns) to red (0.78 microns). The eye is most sensitive to yellowgreen (0.55 microns) which lies well within the violet-red range. Now, the infra red region especially in the 1.0 micron to 15 micron region is blessed with detectors such as gallium arsenide. Accordingly, the illustrative embodiment contemplates a card transparent to light in the visible region and in at least one non-visible region such as infra red.

One flexible-tough thermoplastic having this spectras requirement is polyvinyl chloride (PVC). PVC having the chemical structural form $$\left[ -CH_2-\underset{\displaystyle Cl}{\underset{|}{CH}}- \right]_n$$

suitably permeable in the visible and infra red regions. In the latter case, PVC bandpass transmission characteristic is substantially flat and non-absorbant from about 3.5 microns to about 7.0 microns. It was also observed that a carbonyl group attached to such a polymeric film structure would exhibit a near single frequency absorption characteristic well within the 3.5 – 7.0 micron range at 5.8 microns.

In the preferred embodiment, the card is formed from a film of PVC laminated onto a film of polyvinyl chloride acetate (PVCAC). The PVAC layer can be exceedingly thin. The indicia can be encoded onto the card by selectively aperturing the PVAC layer by punching holes before lamination. Upon lamination, the PVC is caused to fill the apertures. This renders the apertures optically indistinguishable in visible light. Alternatively, the encoding can be accomplished by the deposition of PVAC strips onto discrete preselected areas of the PVC film by rapid evaporation process.

It should be recalled that PVAC has substantially similar optical and physico-chemical characteristics as PVC but for its discrete near single frequency absorption characteristic. This means that light illuminating the laminate in the visible region will be either passed through the structure or partially reflected from the surfaces uniformly. As the laminate is illuminated by light in the infra red region, a spectral difference is detectable only on or about 5.8 microns.

Since PVC and PVAC are commercially available in sheet form lamination can be effectuated by placing respective sheets one upon the other between hot platens or calenders. Because the dwell time between the calender rolls is short in the order of a second or less, a temperature above the melting temperature of approximately 250°C can be used. Note that in this form of lamination, there is only a small amount of plastic flow.

As previously mentioned, the best form contemplates that only the second film contain the carbonyl groups. It is recalled from Beer's law that the amount of light absorbed is proportional to the concentration of the absorbing material. Consequently, if the second film has a significantly higher concentration of carbonyl groups than the first film, then there would still be a detectable spectral difference at 5.8 microns. This factor becomes of some significance in the practice of the invention in view of the commercial difficulty of obtaining carbonyl group free PVC. Illustratively, films frequently contain plasticizers, e.g., dioctal phthalate (di-2-ethyl hexyl phthalate) to maintain a degree of suppleness. This plasticizer contains as many as 2 carbonyl groups per mole. Likewise, polyaromatic stabilizers may be added to prevent polymer degradation. These also contain carbonyl groups. Thus, it is of importance that the relative concentration be kept in mind when fashioning the invention from commercial materials.

In circumstances where it is desired to protect the coded indicia from alteration due to wear or accidental scratching, a PVC layer can be laminated on top of the second film forming a sandwich therefrom. Vacuum lamination, for example, avoids any trapping of gas bubbles.

Another laminate exhibiting a "notch frequency" in the infra red region is a card formed from polyethylene terephthalate and polyethylene.

Note, that the mechanical strength of the bond may vary as a function of the differences, if any, in the melting temperatures and whether the melting point is sharply defined. In the above cases, plastics having amorphous structures are used. In this actuation, a range of melt temperatures can be expected.

It should be observed in connection with the description of the preferred embodiments that the infra-red spectrum is said to be one of the most unique "signatures". Indeed, as pointed out by Koji Nakanishi in, "Infra-red Spectroscopy," Holden Day, Inc., San Francisco, 1962, at pages 1, 3 and 17, absorption bands that appear with a relatively high intensity in a range characteristic for a certain group and that are useful for the identification of that group are termed "characteristic frequencies" or "characteristic absorption bands". Unfortunately, the infra-red absorption intensities as with intensities in other spectral ranges cannot be expressed in universal constants. In such fields as qualitative organic chemistry, the intensity is usually expressed as very strong, strong, medium, weak, etc. Thus, in order to qualitatively describe the optical spectral response of the preferred embodiments, it is to be understood that it is the relative spectral difference between two films in the light wave region of interest that is being characterized. Illustratively, it may be said in one of the preferred embodiments, a selectively apertured second film having a sharp absorption characteristic is laminated upon a first film, whose absorption within the same light wave region is substantially less absorptive than that of the second film at a near single frequency. The term "near single frequency" is taken to mean that the second film sharp absorption characteristic is manifest on or about 5.8 microns but that there exists an ill-defined region of several cycles per second above and below the nominal frequency within which the strong absorption characteristic is manifest.

While this invention has been described with reference to a preferred embodiment thereof, it will be understood by those of skill in the art that numerous changes can be made in form and details without departing from the spirit and scope thereof.

What is claimed is:

1. A card or the like suitable for use in personal and item identification comprising:

a first film having an optical bandpass transmission free from sharp band absorption characteristics in a predetermined non-visible light wave region; and a selectively apertured second film laminated upon the first film and having a substantially similar spectral response as that of the first film within the predetermined non-visible light wave region of the first film bandpass but for a sharp band absorption characteristic at a near single frequency, the laminate including the apertured portions thereof further exhibiting a substantially uniform transmissivity and surface reflectance in the visible light wave region.

2. A card or the like suitable for use in personal and item identification comprising:

a first film having an optical bandpass transmission free from sharp band absorption characteristics in a predetermined non-visible light wave region; and a second film having discrete areas laminated upon preselected areas of the first film, said second film discrete areas having a substantially similar spectral response as that of the first film within the predetermined non-visible light wave region of the first film bandpass but for a sharp band absorption characteristic at a near single frequency, the first film including the portions discretely laminated with the second film further exhibiting a substantially uniform transmissivity and surface reflectance in the visible light wave region.

3. A card or the like suitable for use in personal and item identification comprising:

a first film having an optical bandpass transmission free from sharp band absorption characteristics in a predetermined portion of the infra-red region; and a selectively apertured second film laminated upon the first film and having a substantially similar spectral response as that of the first film within the predetermined portion of the infra-red region of the first film bandpass but for a sharp band absorption characteristic at a near single frequency, the second film being formed from polymeric material having a carbonyl group and an associated ester group present in the polymer structure, the laminate including the apertured portions thereof further exhibiting a substantially uniform transmissivity and surface reflectance in the visible light wave region.

4. A card or the like suitable for use in personal and item identification comprising:

a first film having an optical bandpass transmission free from sharp band absorption characteristics in a predetermined non-visible light wave region; and a selectively apertured second film laminated upon the first film and formed from the same material but for the presence of trace amounts of a chemical group in the structure of the second film, the second film exhibiting the same spectral response as the first film within the predetermined non-visible light wave region of the first film bandpass with the exception that the chemical group is sharply spectrally absorptive at a near single frequency, the laminate including the apertured portions thereof further exhibiting a substantially uniform transmissivity and surface reflectance in the visible light wave region.

5. A card according to claim 4, wherein the chemical group includes a carbonyl group and an associated ester.

6. A card according to claim 4, wherein: the first film comprises polyvinyl chloride, and the second film comprises polyvinyl chloride vinyl acetate copolymer.

7. A card or the like suitable for use in personal and item identification comprising:

a first polyvinyl chloride film; and a selectively apertured second polyvinyl chloride film laminated on the first film and having carbonyl groups attached to the second film polymeric structures in a concentration of sufficient magnitude such that its infra-red spectrum shows a distinctive single frequency absorption characteristic lying within the infrared transmission band of the first film, said laminated structure exhibiting a substantially uniform transmissivity and surface reflectance in the visible light wave region.

* * * * *